June 3, 1952 J. W. ORENDORFF 2,599,475
BEET HARVESTER LOADING CART
Filed May 12, 1948 3 Sheets-Sheet 1

Inventor.
John W. Orendorff
Paul O. Pippel
Atty.

June 3, 1952 J. W. ORENDORFF 2,599,475
BEET HARVESTER LOADING CART
Filed May 12, 1948 3 Sheets-Sheet 2
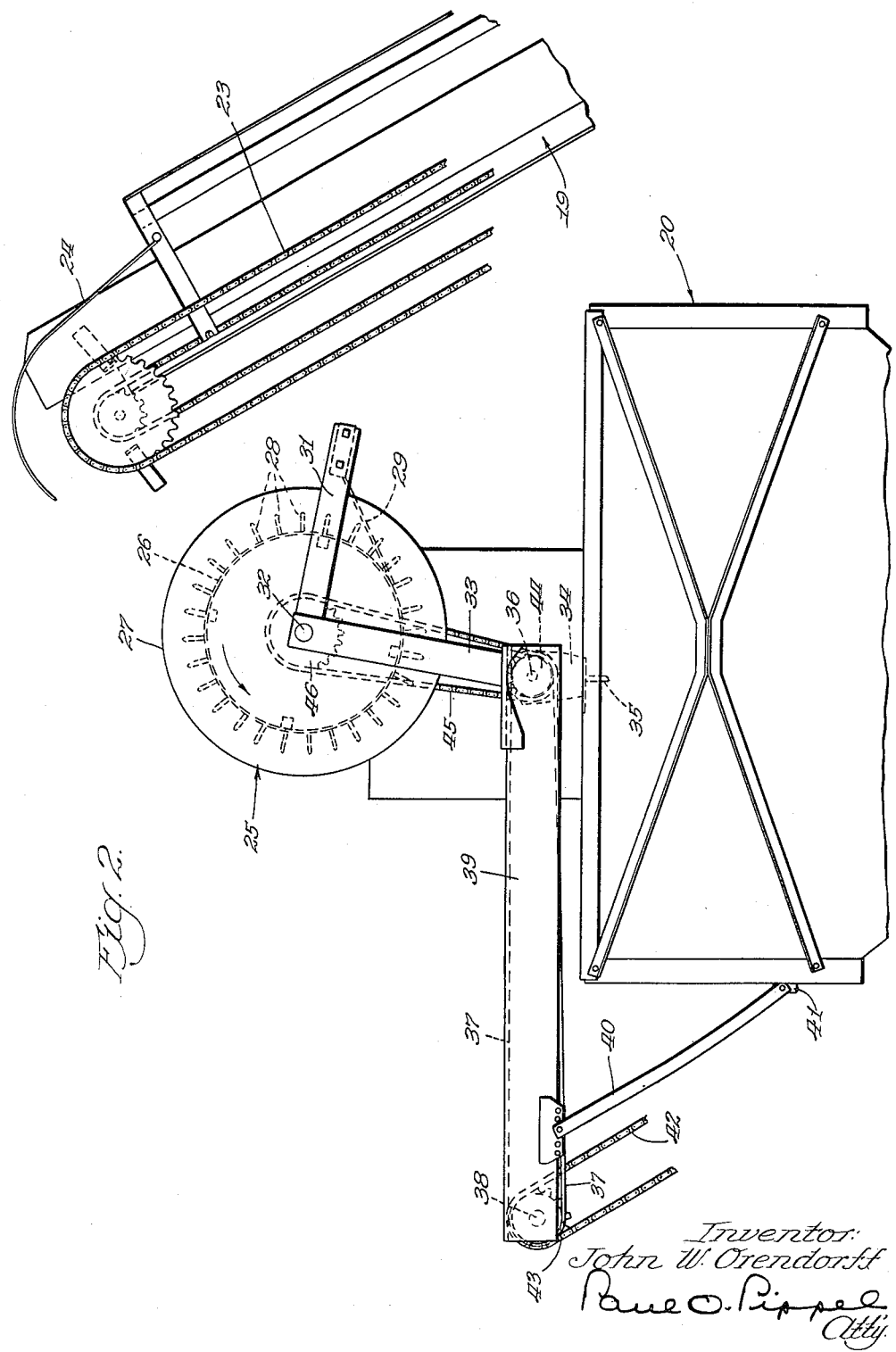

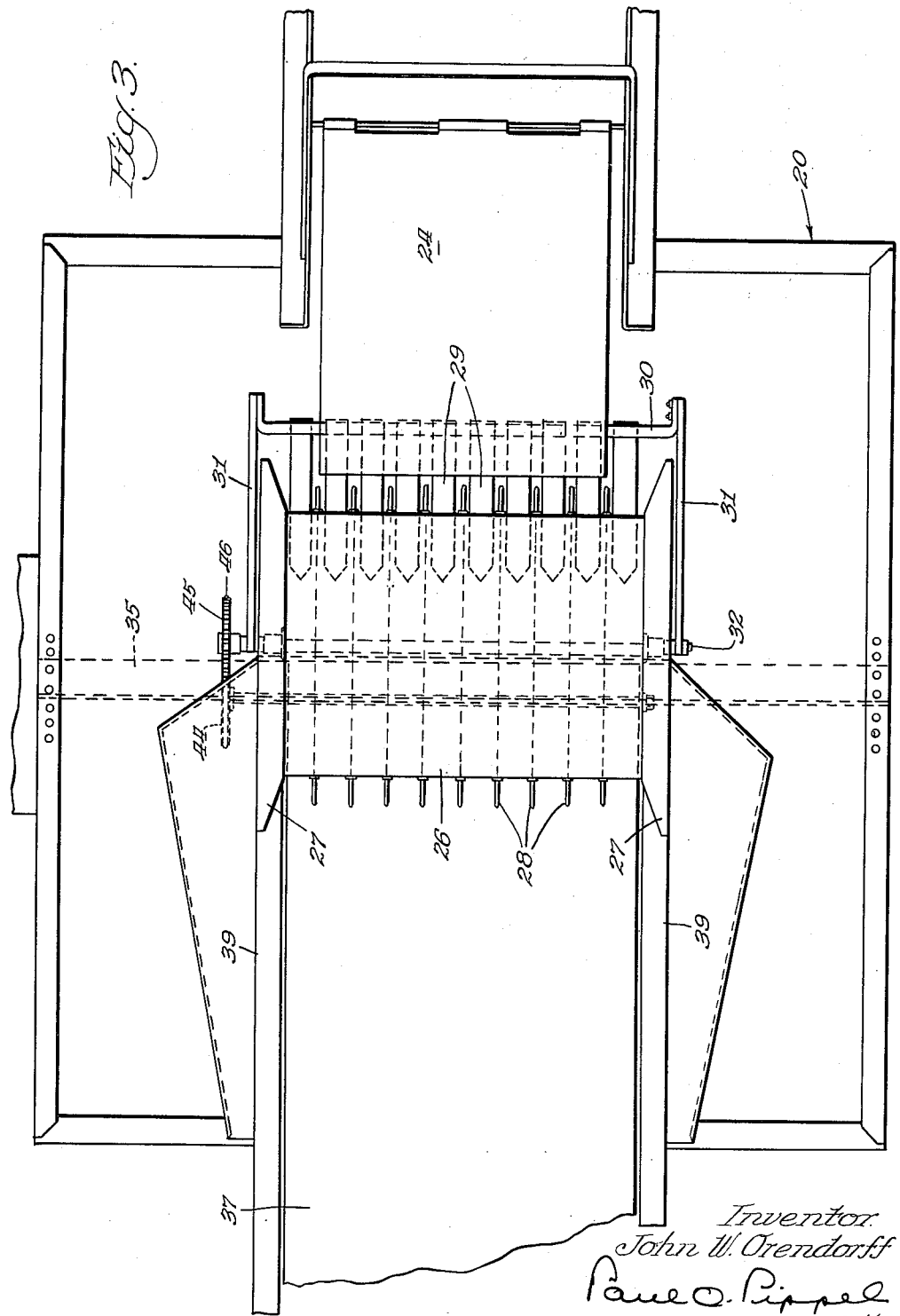

Patented June 3, 1952

2,599,475

UNITED STATES PATENT OFFICE 2,599,475

BEET HARVESTER LOADING CART

John W. Orendorff, Canton, Ill., assignor to International Harvester Company, a corporation of New Jersey Application May 12, 1948, Serial No. 26,531

8 Claims. (Cl. 55—51)

This invention relates to agricultural implements and particularly to beet harvesters. More specifically, the invention concerns mechanism for separating the beets from the debris which normally accompanies the harvesting of beets.

In the harvesting of beets, from the standpoint of economy in the expenditure of time and labor, it is important that the beets be harvested and delivered to the processing plant in as clean a condition as possible and with a minimum of foreign matter in the load to be delivered. In passing through certain soils, particularly dense or wet soils, the tendency of the beet pulling mechanism is to pick up clods of dirt and debris and the problem of isolating the beets from these clods and other debris has occupied the beet industry for many years.

The principal object of the present invention is to provide means for separating the beets from debris and from dirt clinging thereto.

Another object of the invention is to provide in connection with a receptacle or cart to which the beets are delivered as they are harvested, mechanism for separating the beets from the debris prior to depositing the beets in the receptacle.

A further object of the invention is to provide means for separating the beets from the debris accompanying the beets and to deposit the beets in a receptacle while dropping the debris upon the ground.

Another object of the invention is to provide in combination with a beet harvester loading cart to which beets are delivered after they are harvested, a rotary member having spiked teeth thereon arranged in the path of the beets as they are delivered to the cart to empale the beets and isolate them from accompanying foreign matter.

A further object of the invention is to provide mechanism for automatically sorting beets and the like as they are delivered to a receptacle comprising a rotary drum to empale the beets and separate them from the foreign matter associated therewith and an endless belt to receive the foreign matter and convey it to a location beyond the receptacle.

Other objects and advantages of the invention will become clear from the following detailed description when read in conjunction with the accompanying drawings wherein:

Fig. 2 shows an enlarged view of the upper portion of the delivery elevator at the rear end of the beet harvester shown in Fig. 1 and its relationship to the loading cart and sorting mechanism associated therewith.

Fig. 3 shows a plan view of the structure of Fig. 2, wherein for simplicity a number of the drum spikes are indicated schematically.

Figure 1:
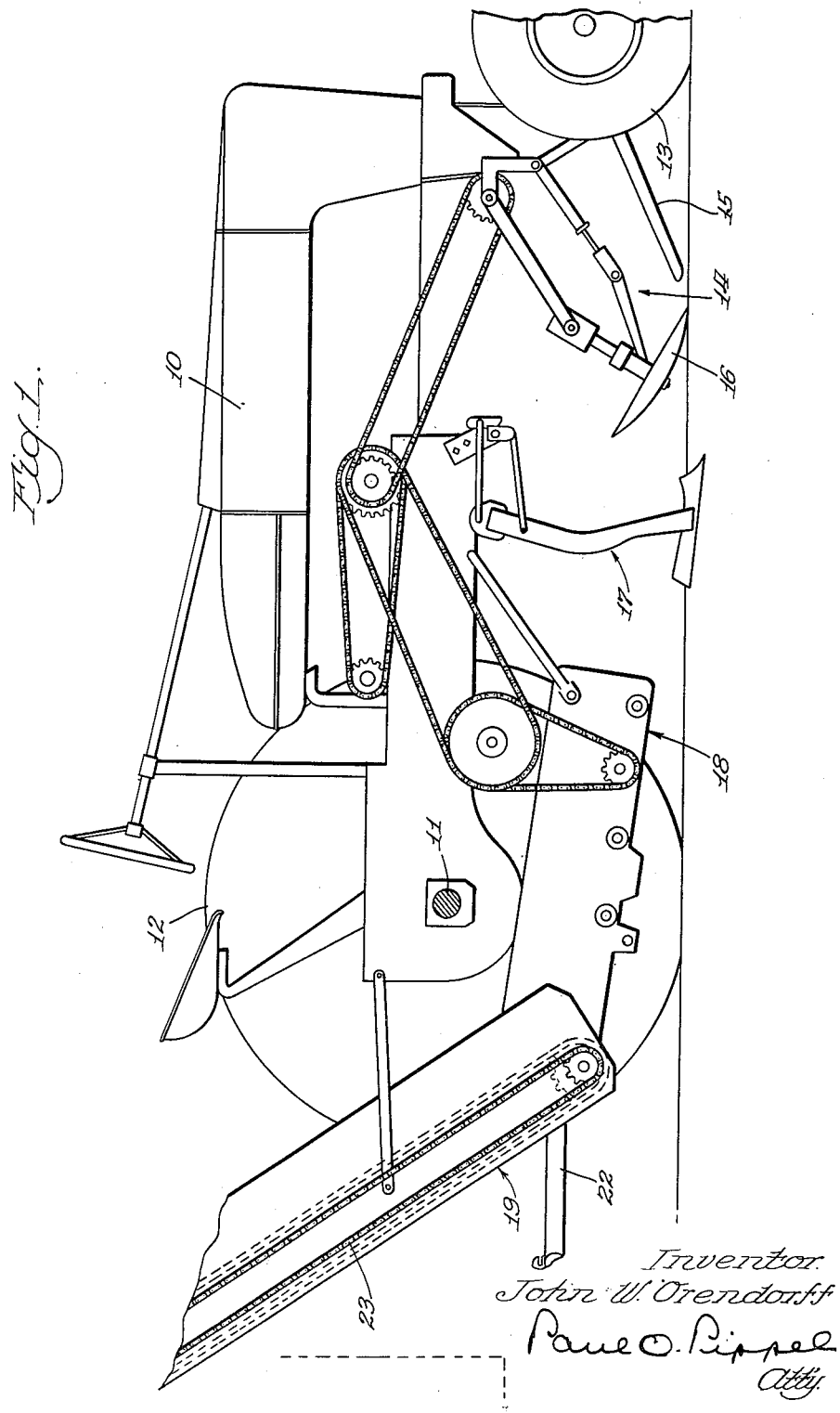
Fig. 1 is a view in side elevation showing the elements of a beet harvester according to the present invention.

Referring to the drawings, and particularly Fig. 1, it will be noted that the beet harvester with which the present invention is associated is mounted upon a tractor designated by the numeral 10 which comprises a transverse rear axle 11, rear drive wheels 12 (only one of which is shown) and dirigible front wheels 13. The harvesting mechanism includes generally a topping mechanism indicated at 14 which includes a feeler gauge 15 and a cutting disk 16. The gauge 15 regulates the position of the cutting blade 16 with respect to the beet to be topped. Rearwardly of the topping mechanism is a digger 17 which lifts the beets from the soil as the tractor traverses a field. The beets are delivered to a conveyor 18 which is adapted to agitate the beets and dislodge some of the dirt and debris therefrom and to direct the beets rearwardly to an elevator 19. No detailed description of the structure and operation of the harvester parts referred to above is believed to be indicated.

Beets received by the elevator 19 at the rear of the tractor are conveyed upwardly and rearwardly for discharging the beets to a receptacle in the form of a cart 20. Only such parts of the loading cart 20 as are essential to an understanding of the present invention are illustrated.

The elevator 19 is driven by an endless chain 23 and a shield 24 is provided at the upper end thereof to confine the beets as they pass over the upper end of the elevator and cause them to drop generally downwardly. As pointed out before, considerable debris in the form of clods of dirt and other foreign matter frequently accompanies the beets as they are carried up the elevator 19 and discharged toward the receptacle 20, and in order to avoid a high incidence of foreign matter in the beet load received in the receptacle or cart, mechanism has been provided to isolate the beets from the debris and to deposit them in the receptacle. This mechanism includes a rotary drum 25 which is provided with a cylindrical body portion 26 and end flanges 27. About the periphery of the drum a number of projections or spikes 28 are provided.

As will be noted particularly well in Fig. 2, the drum 25 and the spikes 28 provided thereon are below the discharge end of the elevator 19 and in the path of beets to be discharged therefrom. The beets and other debris discharged from the elevator fall by gravity upon the drum and the beets are empaled upon the spikes 28. The drum is caused to rotate in an anti-clockwise direction as viewed in Fig. 2 so that the beets are carried around with the drum until they are dislodged by fingers 29 adapted to press against the body of the drum between the rows of spikes 28. These fingers 29 are anchored at one end to a transversely extending rod 30 affixed to the ends of a pair of straps 31 secured to the outer end of a shaft 32 upon which is mounted the drum 25.

Drum shaft 32 is supported in a position above the opening in the receptacle by a pair of laterally spaced standards 33, the lower ends of which are mounted upon brackets 34 secured at spaced locations upon a brace 35 which extends between opposite side walls of the cart. Bracket 34 likewise serves to support the ends of a shaft 36 extending parallel to the shaft 32 immediately adjacent the brace 35 and supporting one end of an endless belt 37, the other end of which extends beyond the rear wall of the cart as indicated clearly in Fig. 2. The other end of the endless belt 37 is carried upon a shaft 38 supported at its ends in side rails 39 serving as the frame for the endless belt 37. The outwardly extending end of the belt assembly 37 is supported against vertical stress by a strap 40 secured at one end to each of the side rails 39. The lower end of the strap is connected to a lug 41 secured to the wall of the cart 20.

The endless conveyor 37 is driven from a chain 42 trained around a sprocket wheel 43 mounted upon the end of the shaft 38. The belt 37 drives the shaft 36 at the other end thereof which in turn through a sprocket 44 and a chain 45 drives a sprocket 46 on the end of the shaft 32, which in turn rotates the drum 25.

As pointed out before, beets discharged from the elevator 19 fall upon the spikes placed about the periphery of drum 25. The beets are empaled upon the spikes and carried around until they are dislodged by the fingers 29. The clods of dirt and other debris falling upon the drum are discharged upon the surface of the endless belt 37 by which they are transported to the end of the belt and discharged upon the ground. Since the drum 25 is mounted at the forward end of the belt 37 and the portion carrying the dislodging fingers 29 is beyond the forward end of the belt and directly over the open upper end of the cart, the beets free of foreign matter are dropped into the receptacle.

The operation of the mechanism of the present invention should be clearly understood from the foregoing description. However, it should likewise be understood that modifications may be made therein without departing from the spirit of the invention or the scope of the appended claims.

What is claimed is:

1. The combination with an open top receptacle and conveying means for delivering thereto root crops such as beets and the like with accompanying dirt and debris, of a generally horizontal conveyor over the opening in the receptacle in the path of the beets and accompanying debris to prevent entrance thereof into the receptacle, a member above the conveyor in the path of the beets and debris discharged thereto, and means carried by the member cooperative with the beets to selectively intercept the latter and prevent them from falling upon the conveyor, said conveyor being arranged to receive the debris and carry it beyond the confines of the receptacle.

2. A cart for use in connection with a harvester for beets and the like to receive the harvested crop, comprising a frame, an open-top receptacle mounted upon the frame in the path of beets and accompanying debris discharged by gravity from the harvester, a generally horizontal conveyor over the opening in the receptacle in the path of the beets and accompanying debris to prevent entrance thereof into the receptacle, a member above the conveyor in the path of the beets and debris discharged from the harvester, and means associated with said member for selectively intercepting the beets and depositing them in the receptacle, said conveyor being adapted to receive the debris and carry it beyond the confines of the receptacle.

3. In a power operated harvesting machine for beets and the like including a wheeled supporting frame, means for lifting the beets from the soil, a receptacle, means for conveying the beets from the lifting means to the receptacle, an endless belt associated with the receptacle in the path of the beets and accompanying debris discharged from the conveying means, said belt extending to a location to discharge the debris from the receptacle, a rotary member having spikes adapted to empale the beets and separate them from the debris, means for driving the belt to discharge the debris including means for driving the rotary member, and means associated with said rotary member for dislodging the beets and depositing them in the receptacle.

4. The combination with an open-top receptacle and conveying means for delivering thereto beets and the like, of an endless belt associated with the receptacle in the path of the beets and debris accompanying the beets in a position to prevent entrance thereof into the receptacle and extending to a location beyond the receptacle opening, a rotary member vertically below the conveying means interposed between the latter and the endless belt, said member having radially projecting spikes adapted to receive by gravity and empale the beets without interfering with passage of the debris to the endless belt, and means for driving the endless belt to discharge the debris received thereon beyond the receptacle.

5. In a power operated harvesting machine for beets and the like including a wheeled supporting frame, means for lifting the beets from the soil, a receptacle, means for conveying the beets from the lifting means to the receptacle, and means between the conveying means and the receptacle for isolating the beets from foreign matter accompanying the beets comprising a rotary drum positioned below the point of discharge of the beets from the conveying means, said drum having radially extending spikes arranged about the periphery thereof adapted to empale the beets as they fall by gravity therefrom, and means for dislodging the beets from the spikes and depositing them in the receptacle.

6. The combination with an open-top receptacle and conveying means for delivering thereto by gravity root crops such as beets and the like, of movable means associated with the receptacle in the path of the beets and debris accompanying the beets to prevent their entrance into the receptacle and extending to a location beyond the receptacle opening, a rotary member vertically below the conveying means interposed between the latter and the movable means, said member having radially projecting spikes adapted to receive by gravity and empale the beets without interfering with passage of the debris to the movable means, and means for moving the movable means to discharge the debris received thereon beyond the receptacle.

7. A cart for use in connection with a harvester for beets and the like to receive the harvested crop, comprising a frame, an open-top receptacle mounted upon the frame including a bottom, generally upright side walls and an elevator for unloading beets from the receptacle, a rotary drum carried by the cart in the path of the beets and accompanying debris discharged from the harvester, said drum having radially extending spikes adapted to empale the beets and discharge them into the receptacle, and means for preventing entrance of the debris into the receptacle.

8. A cart for use in connection with a harvester for beets and the like to receive the harvested crop, comprising a frame, an open-top receptacle mounted upon the frame including a bottom, generally upright side walls and an elevator for unloading beets from the receptacle, a rotary drum carried by the cart in the path of the beets and accompanying debris discharged from the harvester, said drum having radially extending spikes adapted to empale the beets and discharge them into the receptacle, and means for effecting independent operation of the drum and the elevator.

JOHN W. ORENDORFF.

REFERENCES CITED

The following references are of record in the file of this patent:

UNITED STATES PATENTS

| Number | Name | Date |
|---|---|---|
| 518,770 | Young | Apr. 24, 1894 |
| 920,919 | Cooper | May 11, 1909 |
| 1,153,381 | Gudmundsen | Sept. 14, 1915 |
| 1,403,929 | Welton | Jan. 17, 1922 |
| 1,431,814 | Kanengieter | Oct. 10, 1922 |
| 1,747,625 | Gudmundsen | Feb. 18, 1930 |
| 1,895,268 | Silver | Jan. 24, 1933 |
| 2,151,894 | Cambessedes | Mar. 28, 1939 |
| 2,350,173 | Loucks | May 30, 1944 |
| 2,462,128 | Roach | Feb. 22, 1949 |
| 2,470,211 | Bozeman | May 17, 1949 |

FOREIGN PATENTS

| Number | Country | Date |
|---|---|---|
| 60,828 | Germany | Feb. 16, 1892 |
| 88,190 | Germany | Sept. 21, 1896 |
| 228,057 | Germany | Nov. 1, 1910 |